United States Patent [19]

Rancatore

[11] 4,202,076
[45] May 13, 1980

[54] SUCTION CRAB PICKER SYSTEM SUITABLE INTERALIA FOR HOME USE

[76] Inventor: Paul Rancatore, 7900 Danube St., New Orleans, La. 70126

[21] Appl. No.: 825,080

[22] Filed: Aug. 16, 1977

Related U.S. Application Data

[63] Continuation of Ser. No. 635,889, Nov. 28, 1975, abandoned.

[51] Int. Cl.$^2$ ............................................. A22C 29/00
[52] U.S. Cl. ......................................... 17/48; 17/51; 17/71
[58] Field of Search .................... 17/71, 48, 45, 52, 51

[56] References Cited

U.S. PATENT DOCUMENTS

| | | | |
|---|---|---|---|
| 965,706 | 7/1910 | Greiner | 17/73 |
| 2,903,737 | 9/1959 | Ward | 17/71 X |
| 3,274,640 | 9/1966 | Rossnan | 17/71 X |
| 3,696,465 | 10/1972 | Rossnan | 17/48 |

FOREIGN PATENT DOCUMENTS 145140  4/1950  Australia ...................... 17/71

Primary Examiner—J. M. Meister
Attorney, Agent, or Firm—C. Emmett Pugh & Associates

[57] ABSTRACT

A crabmeat extraction apparatus and method for extracting the meat of the crab from its inner meat cavities using uniquely designed cleaning probe and conveying tube used in association with a standard home vacuum cleaner as a suction source to pull the crabmeat into a central container. The system includes suction hoses with crabmeat probes attached thereon leading to the collection container. The meat collection container has a hose attachment leading to a standard home-type vacuum cleaner which serves as the source of negative air pressure or suction for collecting the meat. Additionally, a little water is initially sucked into the system to keep the meat moist and lubricate the tubes. The crab is initially prepared by removing the outer shell (carapace), the legs, etc. and the entrails, etc. The inner, meat-containing body is then quartered by means of breaking or cutting the inner body in half in a vertical plane and cutting the halves into quarters in the horizontal plane, exposing the crab meat in the meat cavities for removal by the apparatus of the present invention.

2 Claims, 10 Drawing Figures

SUCTION CRAB PICKER SYSTEM SUITABLE INTERALIA FOR HOME USE

This is a continuation, of application Ser. No. 635,889, filed Nov. 28, 1975, entitled "Suction Crab Picker" now abandoned.

BACKGROUND OF THE INVENTION

1. Field of the Invention

The present invention relates to a crabmeat extraction device and method for extracting meat from the bodies of crustacea by suction techniques. The present invention has been found to be particularly useful in the extraction of meat from the bodies of cooked or boiled crustacea, especially as a system for extracting meat from the bodies of crabs, and hence, will be discussed with particular reference thereto.

2. Description of the Prior Art

The cleaning of crabmeat from the bodies of crabs for home use or commercial sale has long been a difficult endeavor, as the preparation of the edible part of the crab has always involved a considerable amount of difficult, unpleasant hand labor. In fact, until the present invention, relatively small scale users, such as for example the housewife, have had to depend totally on hand processing and picking of the crab meat, which has been a substantial deterrent to such use.

Even for commercial processors, the search for a practical way of picking the crabmeat from the crab body has been long and extensive, with many different ways explored to remove the meat from the crab shell in an efficient manner with minimum shell content in the meat. Thus, to reduce the amount of manual labor and to increase the efficiency involved in the manual labor of extracting meat from crab bodies, various mechanical and pneumatic systems have been suggested, but none have yet been generally successful.

GENERAL DISCUSSION OF THE INVENTION

The present invention uses a very simple but highly effective design including a cleaning and conveying device in conjunction with a meat collection section and a suction section to remove meat from a crab body, or from several crab bodies simultaneously, and then collect the meat for later packaging or use. The present invention, while utilizing a suction system attached to a meat collecting tube with probes, uses suction applied to crab quarters cut to most efficiently expose the crab meat to the probes and additionally uses cleaning means as part of the probe to aid the operator in gaining access to the maximum amount of crab meat with minimum shell content. Also, a small amount of water may be introduced into the tubes and crab meat container for lubrication and to keep the crab meat moist. In addition, by utilizing the foregoing structures and techniques, a standard home-type vacuum cleaner is used in the present invention as the source of negative pressure because the efficient cutting of the crab and the use of the cleaning means of the probe to loosen the meat permits the use of the suction power available in such a mechanism.

The present invention thus opens up the use of an automated approach to crab meat removal available to all users, including home use, allowing crab meat removal in an easy, efficient and rapid manner.

DESCRIPTION OF THE DRAWINGS

For a further understanding of the nature, objects and advantages of the present invention, reference should be had to the following detailed description, taken in conjunction with the accompanying drawings, in which like parts are given like reference numerals, and wherein:

FIG. 1A is a plan view of the top of the lid of the crab meat collection container shown in FIG. 1 with attached intake and exhaust piping.

DETAILED DESCRIPTION OF THE PREFERRED EMBODIMENTS

Introduction

The preferred embodiments of the crabmeat extraction system of the present invention may be used to extract meat from any crustacea body wherein it is important that mechanization be used to obtain the meat with a minimum amount of shell and where such mechanization should be capable of adaptation to obtain meat from multiple bodies simultaneously as well as from a single body. A particularly important area of application in the present invention is obtaining meat from crabs, and therefore, the preferred embodiment will be described in detail with respect to such an application. However, it should be realized that the present invention could be applied to, for example, other crustacea where it is desired to extract meat and it is possible to use the probe and hose and suction system of the present invention with the possibility of fluid lubrication and the option to process multiple bodies simultaneously.

In the preferred embodiment of the present invention, as will be explained more fully below, the meat extraction is accomplished through the application of suction tubes to the area of meat cells located in the inner crab body sections cut into quarters. The meat is loosened by a probe attached to the vacuum hose which is inserted into the exposed meat cells of the inner crab quarters. The crab meat is conveyed by suction to a container, and the conveying air continues through a second tube attached to the container through a standard, home-type vacuum cleaner. Also, a small amount of water is introduced into the system prior to cleaning for lubrication of the hoses and to keep the extracted meat moist.

Thus, the crab meat is sucked away out of the sectioned crab by a combination of the mechanical probe and the suction pressure using a human operator for guidance to extract the maximum amount of meat from the crabs with minimum shell content.

Structure and Method of Use

Figure 1:
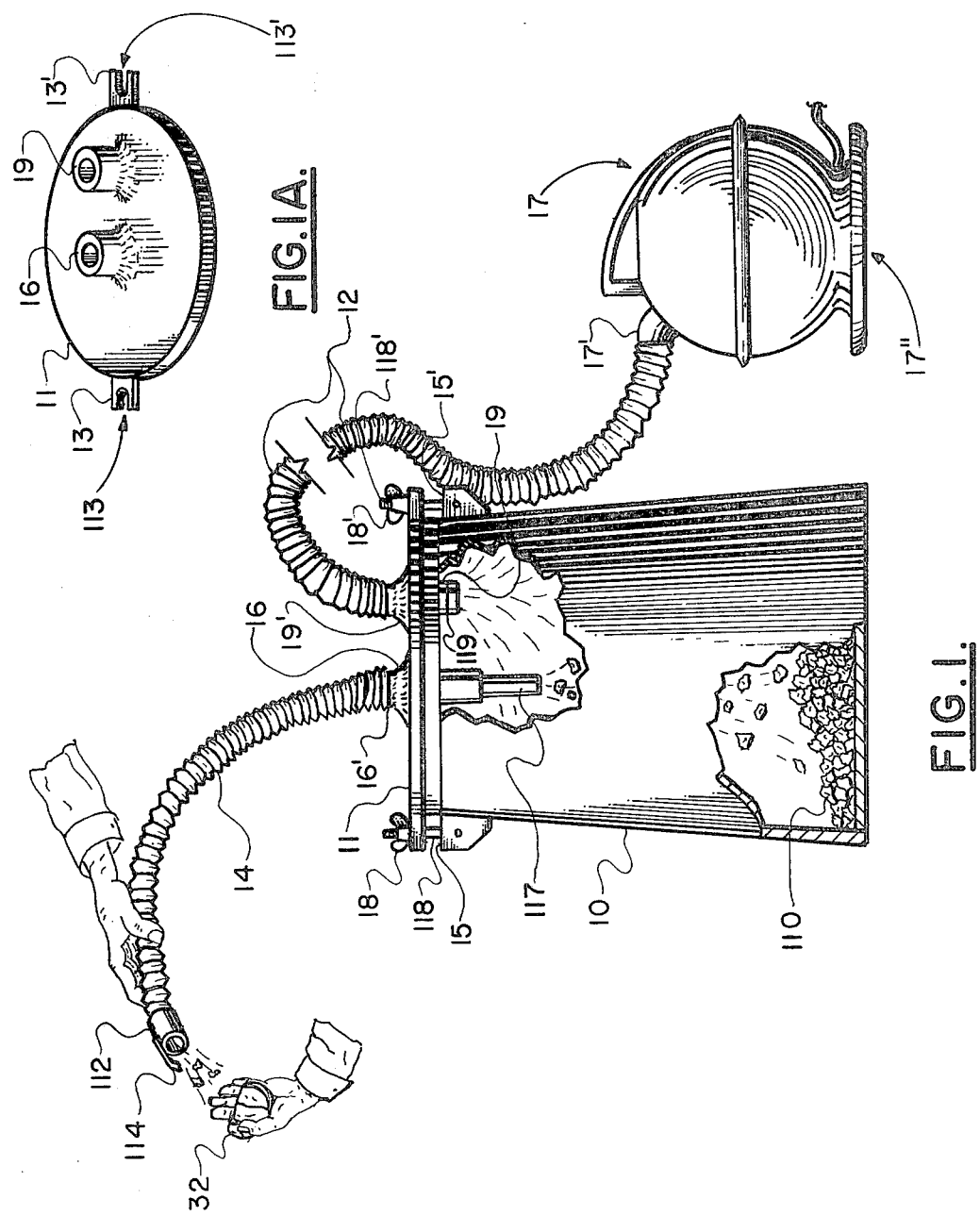
FIG. 1 is a front elevational view of a first preferred embodiment of the suction crab picker of the present invention showing the system in use with a standard home-type vacuum cleaner, generally described as a cannister-type vacuum cleaner.

Referring particularly to FIG. 1, there is shown the crab meat extraction system of the present invention comprising the crab meat pick-up or extraction system 112, 114, the crab meat collector 10 for a single hose 14, and the source of suction 17, in use with a crab quarter section 32 in the position for cleaning.

The crab meat pick-up or extraction system includes a probe 114 with a projecting lip configured for insertion within the meat cells of the crab for physically contacting and mechanically dislodging the meat. As can be seen from FIG. 1 (note also FIG. 2), the probe 114 comprises an elongated finger-like member which extends out from the hose 14 in the longitudinal direction and is located off on the side away from the center of the hose 14, with the distal tip angled in toward the center. The probe 114 is attached to nozzle 112 on the distal, operative end of hose 14. The probe 114 and nozzle 112 is preferably made of stainless steel or of a strong plastic material while the hose 14 is preferably made of flexible plastic material. Hose 14 is also sealingly connected at its other, proximal end to inlet nozzle 16 of top 11. Nozzle 16 joins elongated tube 117 extending down into stainless steel container 10. Nozzle 19 also extends through top 11 as a part of the suction connection within container 10 and is sealingly engaged to hose 12 by seal 19'. Connection 19 extends down into container 10 only a relatively short distance, less than that of connection 16, to permit evacuation of the container of conveying air without carrying any crab meat away.

Attached to nozzle 19 through hose 12 is vacuum source 17 or low pressure source, such as for example the standard consumer home vacuum tank-type unit 17 shown in FIG. 1 at inlet 17'. The air flowing through vacuum cleaner 17 is exhausted through outlet 17''.

The removable top 11 is sealingly connected to stainless steel container 10 by wing-nut screws 18, 18' screwingly engaged down onto pivot bolts 118, 118' positioned in slots 113, 113' of the lateral extensions or ears 13, 13' on stainless steel container 10. The bolts 118, 118' pivot about a horizontal axis pin and contain flanges 15, 15', respectively, to move into and out of the slots 113, 113' as desired.

If necessary or desirable, a screen or other filter may be employed at the inlet 17' to vacuum cleaner 17 or in hose 12 or as part of nozzle 19 or connection 19', such a filter being generally illustrated as element 119, in order to doubly insure that no meat is sucked into the vacuum cleaner. It is noted that the container 10 is free-standing and structurally separate from the vacuum cleaner 17.

Figure 2:
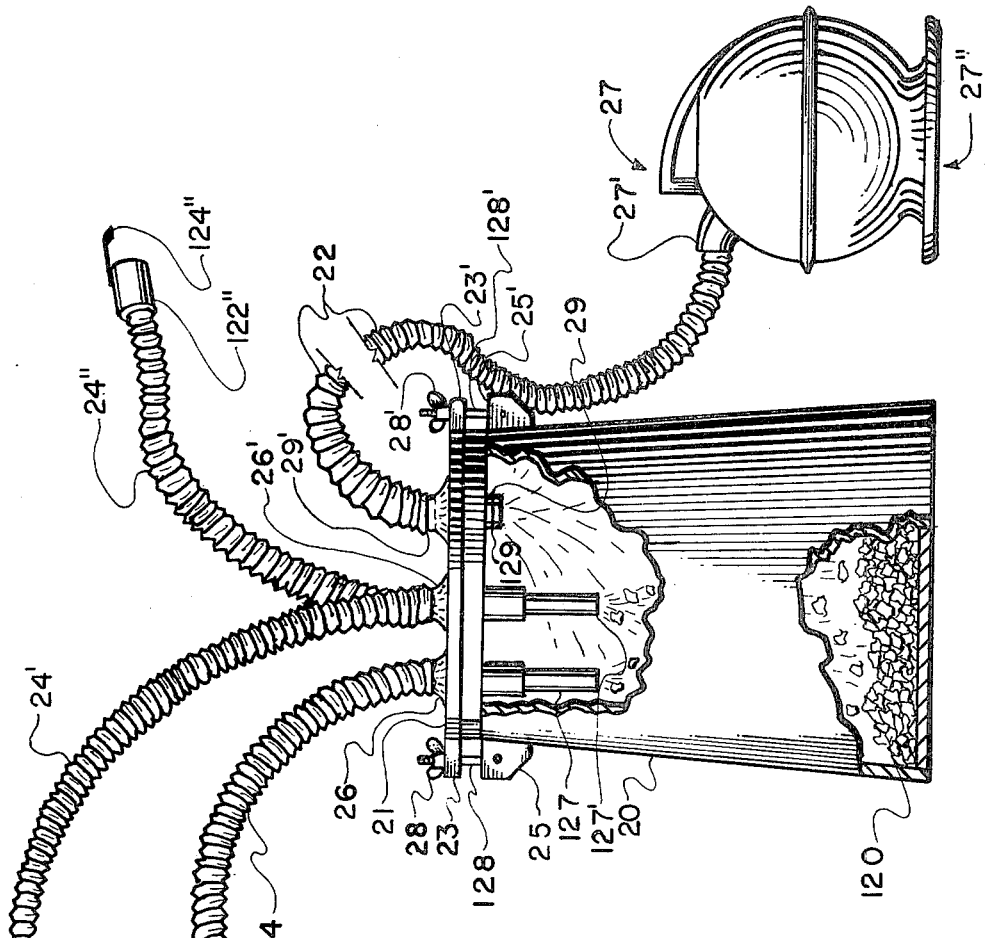
FIG. 2 is a front elevational view of a second preferred embodiment of the suction crab picker of the present invention in a form designed for multiple operator or commercial use.
Figure 2A:
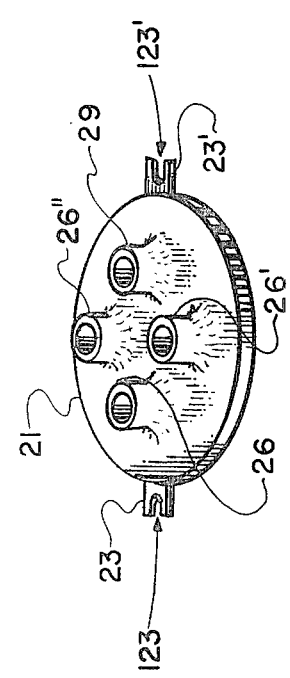
FIG. 2A is a plan view of the top of the lid of the crab meat collection chamber shown in FIG. 2 with attached intakes and exhaust piping.

As best shown in FIG. 2 and 2A, a commercial type embodiment of the present invention can include multiple probes 124, 124', 124'' connected to nozzles 122, 122', 122'' of tubes 24, 24', 24'' which all feed into the container 20, so that the container 20 forms a central container for several crab cleaning stations for crab meat extraction by multiple human operators. The elements of the embodiment of FIG. 2 are at least structurally and functionally similar, if not identical, to the embodiment of FIG. 1. Thus, for the sake of brevity, a detailed description is not being re-presented here, but it is noted that the elements of FIG. 2 (2A) are similarly numbered to the analogous elements of FIG. 1(1A), except that the "tens" number of the latter has been raised to an analogous "twenties" number in the former; thus, for example, hose 24 and nozzle 122 of FIG. 2 are analogous to hose 14 and nozzle 112 of FIG. 1.

Crab Preparation

As indicated in the "introduction" hereof, the primary field of application of the present invention is the extraction or removal of the meat from crab bodies. "Crab" is a name applied to the short-tailed decapod Crustacea, the Brachyura, and to other forms, especially of the section Anomura, which may resemble them in appearance and habits. Brachyurans, or true crabs, are distinguished from the long-tailed lobsters and shrimps by the small abdomen or "tail", folded up under the body.

Many crabs are sought as food by man. The most important and valuable are the edible crab of British and European coasts (Cancer pagurus), the blue crab (Callinectes sapidus) of the Atlantic coast and the Dungeness crab (Cancer magister) of the Pacific coast of North America. The Cancer crab fishery of Europe ranks next in importance to its lobster industry. The crustacean fisheries of India outweigh in quantity and value the yield of all other fisheries of that country, the crabs being outranked only by the shrimps in importance. The swimming crabs, Scylla and Portunus, related to the American blue crab, are among the most important sources of sea food throughout the entire Indo-Pacific region. Scylla serrata reaches a large size, 8 to 12 inches in width, exceptionally 18 inches in the brackish waters of Chilka lake, India. Commercially valuable Anoumus are the lithodid (literally "stone") crabs, of which the so-called king crab (Paralithodes camtschatica) of Japan, the Bering Sea and Alaskan waters is the most important.

Figure 3A:
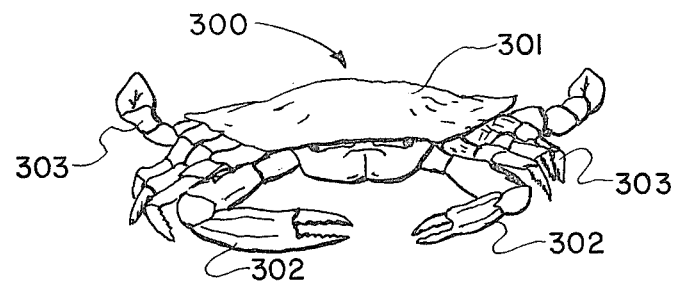
FIGS. 3A, 3B and 3C are front, perspective views of the crab body in various stages of sectioning beginning with the complete crab (FIG. 3A), the major parts of the crab in exploded array (FIG. 3B), and ending with the quarter sections of the inner meaty portion of the crab ready for meat extraction by the apparatus of the present invention.

In most brachyurans, as can be seen from the crab 300 illustrated in FIG. 3A, the body is transversely oval or triangular in outline, more or less flattened and covered by the carapace 301. There are five pairs of legs 302, 303. The first pair 302 end in pincers or chelae and are usually much more massive than the others, which are used in walking or swimming. The eyes 306 are set on movable stalks and can generally be withdrawn into sockets in the front part of the carapace 301. There are six pairs of jaws and foot-jaws (maxillipeds) enclosed within a "buccal cavern," the opening of which is covered by the broad and flattened third pair of foot-jaws. The abdomen is usually narrow and triangular in the males (note element 305 in FIG. 3B), but in the females is broad and rounded and bears appendages to which the eggs are attached after spawning.

The crabs are preliminarily prepared for meat removal by removing the main claws 302, 303, removing the top shell 301, removing the deadmen 304, removing the intestines and eggs, breaking the crab in half, rinsing each half to remove the fat, quartering the crab with a knife and removing the feelers, if not previously removed. The crab is then ready for the suction operation.

Figure 3B:
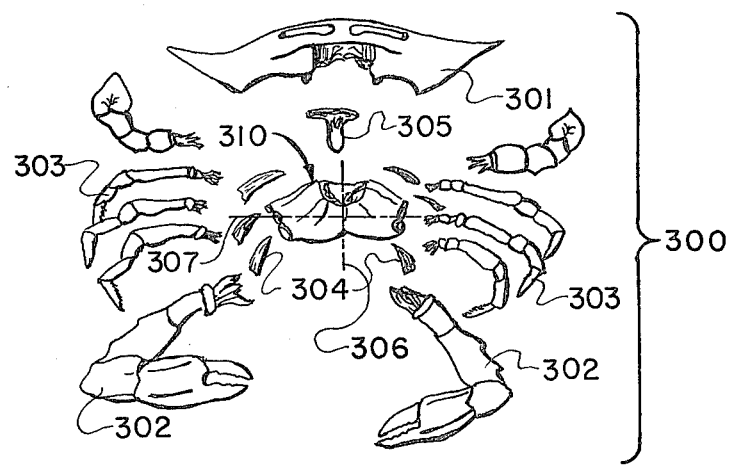
Figure 3C:
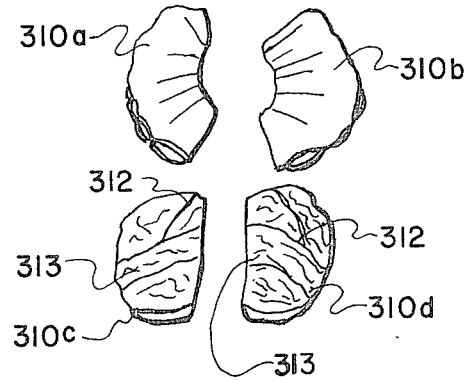

As best shown in FIGS. 3B and 3C, the inner, meat-containing body 310 is prepared to form quarter sections 310a, 310b, 310c, 310d by first cutting or breaking the inner, meat-containing body 310 along line 206 of FIG. 3B, thereby bisecting it into two pieces along a plane perpendicular to the horizontal plane of the lower portion of the crab 300. The line 306 represents the shorter, horizontal center-line of the crab. Each half of the crab 310a–310c, 310b–310d is then cut into quarter sections as shown in FIG. 3C, across the horizontal plane as generally indicated by line 307 of FIG. 3B, which exposes the meat 313 contained between the cell walls 312, the cut being made by a knife or cutting saw. Of course, the horizontal cut can be made prior to the break along line 306, in which case both the left and right portions can be cut across in the same cutting action.

In preparation for crab cleaning, a little water is initially sucked into the collection system to keep the meat 120 in chamber 10 moist and lubricate the tube 14.

The operator then grasps a crab quarter section 32 in one hand with the exposed meat cell positioned upwardly and uses the probe 114, 124, 124', 124" to loosen the meat slightly from the crab section 32 as necessary. The probe tip is also used to move the cell wall 312, which is particularly helpful for "closed over" cells where the meat is not fully or truly exposed. The meat either through the force of suction through the tube 14, 24, 24', 24", or through the use of the probe 114, 124, 124', 124", and the force of suction through the tube, is pneumatically sucked through the tube into container 10 (20) where it drops to the bottom and is kept moist by the small amount of moisture in the container 10 (20). The air used for suction and conveyance is then sucked through connector 19 (29) through tube 12 (22) and into the vacuum cleaner 17 (27) where it is finally exhausted through outlet 17"(27"). After container 10 (20) is full of meat 110 (120), the crab meat can be removed by removing top 11 (21). Although a few shell pieces may still get into the meat 110 (120), only a minimum amount is present and these can be removed during inspection.

The suction approach of the present invention also allows for easy cleaning of the meat conveyance (14, 24) and collection (10, 20) sections. After the crab meat (110, 120) is dumped out, a little water and detergent can be sucked up through the hose (14, 24) and into the catch container (10, 20) for easy and complete cleaning.

Figure 5:
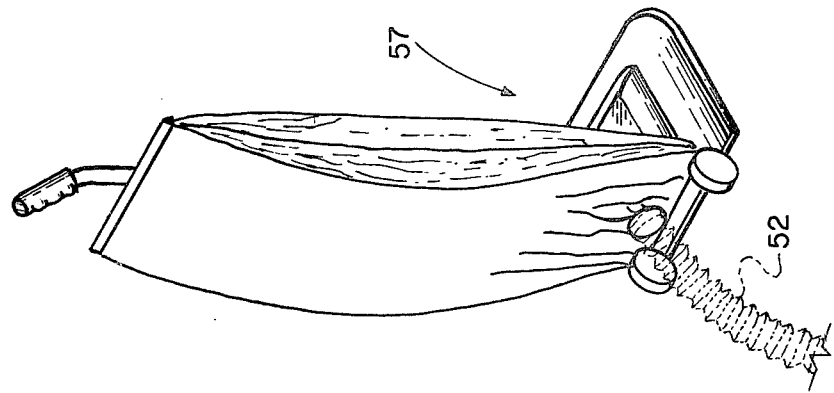
FIGS. 4 and 5 are perspective views of alternate embodiments of standard, home-type vacuum cleaners suitable for use in the present invention, generally described as tank and up-right types of vacuum cleaners, respectively.
Figure 4:
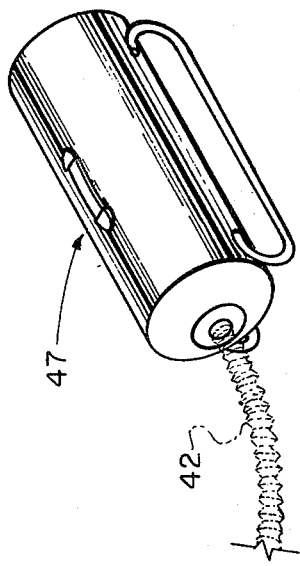

An important aspect of the present invention is that it includes the use of the standard, home type, consumer version vacuum cleaner as the suction source. In addition to the cannister type vacuum cleaner 17, other types of vacuum cleaners are available and can be used in the present invention, such as for example the tank-type vacuum cleaner 47 illustrated in FIG. 4 and the upright type vacuum cleaner 57 illustrated in FIG. 5. By connecting up the hoses 42, 52 (illustrated in phantom line) to the container 10, 20, the apparatus or system of the present invention would operate as described in the foregoing. Additionally of course the home vacuum cleaning system built-in to the walls of some modern homes may also be used as an appropriate source. Standard hoses and connector fittings are available for home vacuum cleaners and such parts are preferably used for the hose 12 and connector 17'.

The modern vacuum cleaner such as those types illustrated in FIGS. 1(2), 4 and 5, develops its suction by means of a fan which discharges a powerful stream of air from the casing. This sets up a powerful inflowing current of air which carries along the meat from the crab body to which the suction nozzle is applied.

Figure 6:
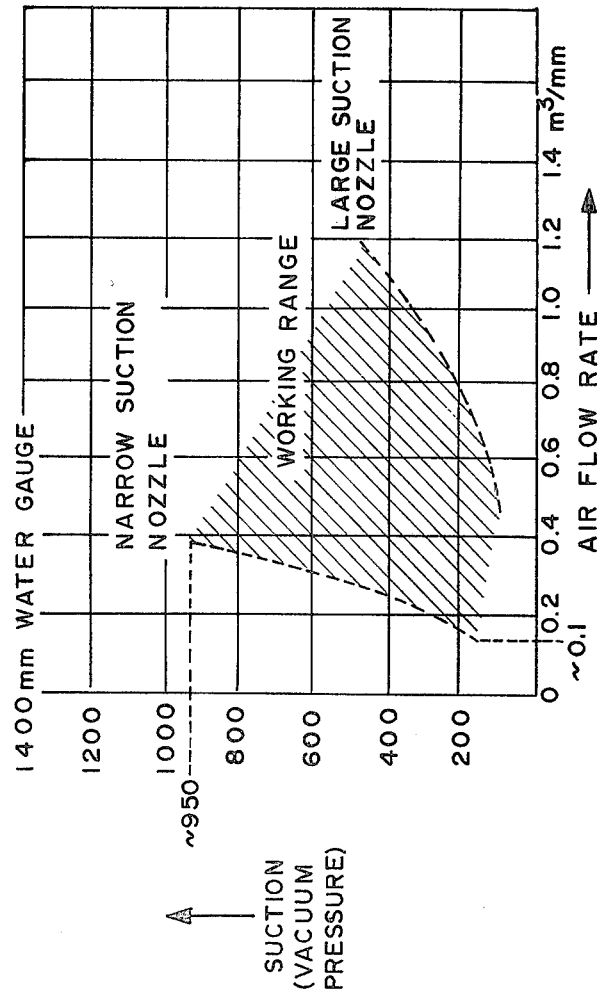
FIG. 6 is a graphical illustration of the "Air Flow/Suction Characteristics" of standard type vacuum cleaners, defining the ideal working range points.

It is noted that, in general, the power input stated on the rating plate of a vacuum claner does not necessarily provide a reliable indication of the suction performance. A sufficiently powerful airflow to carry along the crab meat must be set up. Such an air flow can only be induced by the suction developed by the fan. There are thus two factors involved: air flow rate ($m^3$/min.) and suction (mm water column). These can be plotted against each other in a graph (note FIG. 6), whereby a flow rate/pressure characteristic is obtained, which—depending on the type of fan—may be very steep or relatively flat. The suction performance is the product of these two factors. From the graph of FIG. 6 it appears that the suction is zero when the flow rate is maximum, and vice versa. At both these extreme points the suction performance is therefore zero. For a vacuum cleaner with a straight-line characteristic the best performance is obtained in the middle, i.e., at half the maximum suction and half the maximum air flow rate.

In a well designed suction crab picker of the present invention the various nozzle sizes for nozzles 112, 122 must therefore be so dimensioned and shaped that the resulting performance is within the suitable working range. Thus, in the present invention, the vacuum cleaner operates within the range of approximately 100–950 mm of water on its suction side and an air flow rate in the range of approximately 0.1–1.2 $m^3$/min. In actual tests of the present invention, a clear, plastic tube for hose 14, having an inserted nozzle (analogous to 112) with an inner diameter of one-half inch ($\frac{1}{2}$"), was found suitable.

Although the system described in detail supra has been found to be most satisfactory and preferred, many variations in structure and method are, of course, possible. For example, the system could be quartered along other axes so long as the cell walls are exposed in a convenient manner for probes 114, 124, 124', 124", although the quartering technique disclosed is considered most preferred. Moreover, any type composition of containers 10, 20 with extensions 13, 13', 23, 23' may be used, for example, rather than stainless steel, a clear, see-through plastic container could be used. Likewise, rather than the opaque, ribbed hoses illustrated, clear, see-through plastic tubing could be used. Additionally, any connection may be used to sealingly engage top plates 11, 21 to containers 10, 20 to permit removal of the top plates 11, 21 to remove the crab meat 110, 120 from container 10, 20. Also, the system can be adapted to other types of crustacea meat extraction. Moreover, any type of sealing connection between the inlet hoses 14, 24, 24', 24" and the containers 10, 20 may be used. Also, many other types of vacuum connections and systems may be used.

The above, are, of course, merely exemplary of the possible changes or variations. Because many varying and different embodiments may be made within the scope of the inventive concept herein taught and because many modifications may be made in the embodiments herein detailed in accordance with the descriptive requirements of the law, it should be understood that the details herein are to be interpreted as illustrative and not in a limiting sense.

What is claimed as invention is:

1. A method of extracting meat from the bodies of crabs which comprises the following steps:

(a) preliminarily processing the crab body to at least partially expose the meat including the following sub-steps -
   (a-i) removing the upper outer shell (carapace) and the legs;
   (a-ii) removing the entrails, etc.;
   (a-iii) cutting the remaining inner, meat-bearing crab body into quarter sections by cutting through and across said body in the body's main plane from the area in proximity to the leg openings in the body to the opposing leg openings and severing the crab body in a vertical plane about its shorter horizontal center-line;
(b) providing a suction crab picker system, which system comprises -
   (b-i) a separate, free-standing meat collecting container;
   (b-ii) elongated tubular means associated with said container for conveying the meat from the crab sections to said container;
   (b-iii) suction means connected to but separate from said container means comprising a standard, home-type vacuum cleaner, said vacuum cleaner developing between approximately 100–950 mm of water on the suction side of said vacuum cleaner and an air flow rate through said vacuum cleaner in the approximate range of 0.1–1.2 m$^3$/min.; and
   (b-iv) a mechanical, projecting probe attached to the distal, operative end of said tubular conveyance means and extending out away therefrom in the longitudinal direction, said probe being used to physically contact the meat in the body and dislodging and prying the meat for extraction by said suction means through said conveyance means to said container;
(c) applying a suction from said standard, home-type vacuum cleaner through said conveyance means to the exposed meat to suck the meat from the body with the suction of said vacuum cleaner being in the range of approximately 100–950 mm of water on the suction side with an air flow rate through said vacuum cleaner being in the approximate range of 0.1–1.2 m$^3$/min., and simultaneously loosening the meat by prying and dislodging it loose using said projecting probe to physically contact the meat and move it about;
(d) conveying the loosened, sucked meat to said meat-collecting container pneumatically through said conveyance means; and
(e) exhausting the conveying gas out of said meat-collecting container; whereby the crab meat is relatively easily and quickly removed from the crab body.

2. The method of claim 1 wherein there is further included the step of:
   adding separately a small quantity of lubricating water into the suction system in at least its meat pick-up tubular conveyance means to lubricate its interior and its meat collecting container to keep the picked-up meat moist.

* * * * *